(12) United States Patent
Brinati et al.

(10) Patent No.: US 7,122,608 B1
(45) Date of Patent: Oct. 17, 2006

(54) VDF POLYMERIZATION PROCESS

(75) Inventors: Giulio Brinati, Milan (IT); Paolo Lazzari, Mandello Lario (IT); Vincenzo Arcella, Novara (IT)

(73) Assignee: Solvay Solexis, S.p.A., Milan (IT)

( * ) Notice: Subject to any disclaimer, the term of this patent is extended or adjusted under 35 U.S.C. 154(b) by 0 days.

(21) Appl. No.: 08/885,770

(22) Filed: Jun. 30, 1997

(30) Foreign Application Priority Data

Jul. 1, 1996 (IT) .............................. MI96A1342

(51) Int. Cl.
*C08F 2/00* (2006.01)
(52) U.S. Cl. .................... 526/209; 526/247; 526/255
(58) Field of Classification Search ................ 526/209, 526/247, 255
See application file for complete search history.

(56) References Cited

U.S. PATENT DOCUMENTS 4,864,006 A * 9/1989 Giannetti et al.

5,498,680 A * 3/1996 Abusleme et al. .......... 526/209

FOREIGN PATENT DOCUMENTS

EP 0625526 * 11/1994

* cited by examiner

*Primary Examiner*—Bernard Lipman
(74) *Attorney, Agent, or Firm*—Arent Fox PLLC

(57) ABSTRACT

VDF polymerization process, optionally modified with small amounts of one or more fluoro-containing comonomers, carried out in the presence of a microemulsion comprising a (per) fluoropolyether having neutral end groups, having number average molecular weight between 400 and 3000, and a surfactant based on perfluoropolyethers with salified acid end groups, said surfactant having a number molecular weight Mn comprised between 400–600 and having a distribution of molecular weights such that fractions having a number average molecular weight higher than 700 are not present, or are in amount less than 5% by weight.

13 Claims, No Drawings

VDF POLYMERIZATION PROCESS

The present invention relates to a process for preparing high purity polyvinylidenfluoride.

More particularly it relates to a process for preparing polyvinylidenfluoride (PVDF) with a reduced degree of contamination. The polyvinylidenfluoride obtained by the process of the invention shows also an high thermal stability and improved levels of white index even after thermal treatment at high temperatures, between 200° C. and 250° C. Moreover the reduced contamination of PVDF obtained by the process of the invention makes it possible the use of this material in applications where a high purity is required, for instance in those approved by FDA (Federal Drug Administration). All the properties indicated above are obtained by a high productivity process.

It is known in the art to prepare PVDF, see for instance European patent EP 626,396 in the name of the Applicant, where the temperature synthesis is comprised between 95 and 120° C. with the use of a non dangerous organic peroxide, in particular diterbutylperoxide (DTBP) and in the presence of a chain transfer agent. The surfactants used are those known in the art and in particular Surflon S111S being ammonium salts of mixtures of perfluoroalkylic acids. Such polymer combines good mechanical properties, reduced emission of hydrofluoric acid after exposure in temperature or to chemical agents such as weak bases. However the PVDF prepared according to this patent, has unacceptable white index, and shows too high levels of contamination for the use of PVDF in the applications mentioned above.

Moreover by this process, paraffinic waxes must be added in polymerization to avoid undesired coagula of the polymer on the reactor walls. This brings to PVDF with high contamination levels which further worsens the polymers quality for the indicated applications.

In a successive patent U.S. Pat. No. 5,473,030 in the name of the Applicant, with respect to the art indicated above, it is described the use of a particular chain transfer agent (HCFC-123), not critical from the environmental impact point of view and at the same time capable of assuring superior levels of the PVDF white index, but not yet sufficient to obtain PVDF with a high degree of white index and for approved FDA applications indicated above. A further drawback is given by too high contamination levels for the above applications.

Processes for preparing PVDF with a lower synthesis temperature are known, for instance between 60°–80° C. wherein it is used diisopropyl peroxydicarbonate (IPP) as polymerization initiator, the above mentioned Surflon as surfactant, paraffinic waxes and CFC R11 (trichlorofluoromethane) as chain transfer agent. Also this process does not bring to polymers with acceptable white index and the levels of the contaminants are such that the obtained PVDF cannot be utilized for the applications described above.

The need was felt to have available PVDF with superior levels of white index especially after exposure of the material to temperatures peaks or to staying during the processing step.

Tests carried out by the Applicant have revealed that the discoloration of the manufactured product after a thermal treatment depends on the intrinsic stability of the obtained material but also on the presence of contaminants on the final pellet.

It is known from U.S. Pat. No. 4,990,283 the description of microemulsions based on perfluoropolyethers and on surfactants of the (per) fluoropolyethers class with carboxylic end groups. Their use to prepare various types of fluoro-containing polymers is described in U.S. Pat. No. 4,864,006. Among the fluoro-containing olefins are mentioned in particular those utilized for preparing polymers of the type FEP (TFE/HFP), PFA (TFE/PFPVE), ETFE (TFE/ethylene), perfluoro elastomers (TFE/PFMVE) and fluoro-containing elastomers (VDP/HFP/TFE or VDF/PFMVE/TFE).

Tests carried out by the Applicant with microemulsions exemplified in the U.S. Pat. No. 4,864,006 in the PVDF synthesis lead to a final polymer showing unacceptable colour levels and high contamination levels (see the comparative examples herein-below).

An object of the present invention is therefore a VDF polymerization process, optionally modified with small amounts, generally comprised between 0.1 and 10% by moles, of one or more fluoro-containing comonomers, carried out in the presence of a microemulsion comprising a (per)fluoropolyether having neutral end groups, or microemulsions of fluoropolyoxyalkylenes having hydrogen-containing end groups and/or hydrogen-containing repeating units or microemulsions of fluoropolyoxyalkylenes having hydrogen-containing end groups and/or hydrogen-containing repeating units and hydrocarbons $C_1$–$C_{20}$, preferably $C_1$–$C_{12}$, of aliphatic, aromatic or mixed type, optionally containing halogens, preferably chlorine and/or bromine, said fluoropolyethers having number average molecular weight from 400 to 3000, and a surfactant based on (per)fluoro-polyethers with carboxylic end group salts, preferably sodium carboxylate, said surfactant having a number average molecular weight Mn comprised between 400–600, preferably 400–550, and having a distribution of molecular weights such that fractions having a number average molecular weight higher than 700 are not present, or are in amount less than 5% by weight. The fractions between 600 and 700 not being higher preferably than 60, more preferably 20% by weight in the surfactant.

The comonomers which can be utilized are: chlorotrifluoroethylene (CTFE), hexafluoropropene (HFP), tetrafluoroethylene (TFE), etc. See for instance U.S. Pat. Nos. 4,424,194 and 4,739,024. The preferred amounts of modifying comonomer are generally comprised between 0.5–6% by moles.

The perfluoropolyethers with neutral end groups utilized for preparing the microemulsions of the present invention comprise as repeating units sequences of one or more oxyfluoroalkylenic units such as —$CF_2(CF_2)_zO$—, wherein z is an integer equal to 1, 2 or 3, —$CR_4R_5CF_2CF_2O$— wherein $R_4$ and $R_5$ equal to or different from each other are chosen from H, Cl or perfluoroalkyl from 1 to 4 carbon atoms, —$CF_2CF(CF_3)O$—, —CFYO—, wherein Y is equal to F or $CF_3$. In particular the utilizable perfluoropolyethers have generally number average molecular weight comprised between 400 and 3000, more preferably between 600 and 1500.

Preferably the perfluoropolyethers comprise as repeating units sequences of the following classes:

a) $(C_3F_6O)_{m'}(CFYO)_{n'}$ wherein the unit $(C_3F_6O)$ and (CFYO) are perfluorooxyalkylenic units statistically distributed along the chain; m' and n' are integers such as to give the molecular weight indicated above, and m'/n' is comprised between 5 and 40, when n' is different from 0; Y is equal to F or $CF_3$; n' can be also 0; said units inside the fluoropolyoxyalkylenic chain can optionally be bound among each other by a bond —O—$R'_f$—O—, wherein $R'_f$ has the meaning defined in c);

b) $(C_2F_4O)_{p'}(CFYO)_{q'}$—$(C_3F_8O)_{t'}$ wherein p' and q' are integers such that p'/q' ranges between 5 and 0.3, preferably 2.7–0.5, and such that the molecular weight is the one indicated above; t' being an integer with the meaning of m', Y=F or $CF_3$; t' can be 0 and q'/q'+p'+t' lower than or equal to 1/10 and the t'/p' ratio is from 0.2 to 6;

c) $CR_4R_5CF_2CF_2O$ wherein $R_4$ and $R_5$ are equal to or different from each other and chosen from H, Cl or perfluoroalkyl, for instance having 1–4 carbon atoms, the molecular weight being that indicated above, said units inside the fluoropolyoxyalkylenic chain being bound each other as follows:
$(OCR_4R_5CF_2CF_2)_p$—O—$R'_f$—O—$(CR_4R_5CF_2CF_2O)_q$
wherein $R'_f$ is a fluoroalkylenic group, for instance from 1 to 4 carbon atoms, p and q are integers from 0 to 200, and p+q is at least 1 and such that the molecular weight is that indicated above, d) $CF(CF_3)CF_2O$
said units being linked each other inside the fluoropolyoxyalkylenic chain as follows:
$(OCF_2CF(CF_3))_aO$—$CF_2(R'_f)_xCF_2$—O—$(CF(CF_3)CF_2O)_b$
wherein $R'_f$ has the meaning indicated above, x is 0 or 1, a and b are integers and a+b is at least 1 and such that the molecular weight is that indicated above, e) $(C_2F_4O)_{a'}(CFYO)_{b'}$
wherein a' and b' are integers such that the molecular weight is inside the indicated range, a'/b' ranges between 5 and 0.3, preferably between 2.7–0.5, Y has the meaning indicated above.

The fluoropolyetehers indicated are obtainable with the processes well known in the art, for instance U.S. Pat. Nos. 3,665,041, 2,242,.218, 3,715,378, and the European patent EP 0239123. The functionalized fluoropolyethers with carboxylic end group salts of the invention (see below), are obtained for instance according to EP patent 0148,482, U.S. Pat. No. 3,810,874.

The neutral end groups of the perfluoropolyethers indicated above are: perfluoroalkyls from 1 to 3 carbon atoms, $ClCF_2CF(CF_3)$—, $CF_3CFClCF_2$—, $ClCF_2CF_2$—, $ClCF_2$—.

The microemulsions of fluoropolyoxyalkylenes having hydrogen-containing end groups and/or hydrogen-containing repeating units are described in the patent application EP 625,526, herein incorporated by reference; the microemulsions of fluoropolyoxyalkylenes having hydrogen-containing end groups and/or hydrogen-containing repeating units and hydrocarbons $C_1$–$C_{20}$, preferably $C_1$–$C_{12}$, of aliphatic, aromatic or mixed type, optionally containing halogens, preferably chlorine and/or bromine are described in the patent application EP 95117052.1, herein incorporated by reference. The fluoropolyoxyalkylenes having hydrogen-containing end groups can have a structure similar to the ones indicated for perfluoropolyethers having however at least an end group of the type —$CF_2H$, —$CF_2CF_2H$, —CFH—$CF_3$.

The perfluoropolyether surfactants as defined above have the same repeating units indicated for the perfluoropolyethers having neutral end groups, but at least a carboxylic end group salt. In this case the number average moelcular weight of the surfactant and the distribution of the moleculr weights in the surfactant must be in the above indicated ranges.

The preferred perfluoropolyethers according to the present invention have the following general formula:

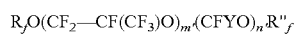

having a random distribution of the perfluorooxyalkylenic units, wherein $R_f$ and $R''_f$ equal to or different from each other are neutral end groups as defined above, m' and n' are integers such as to meet the above requirements of average molecular weight, Y has the meaning indicated above.

The preferred surfactant based on perfluoropolyether has the following formula:

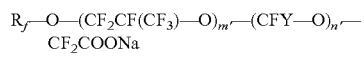

wherein $R_f$, m', n' and Y have the meaning indicated above.

For preparing the microemulsions see the patents U.S. Pat. No. 4,990,283, EP 625,526, EP 95117052.1, herein incorporated by reference.

By the microemulsion term, a system is meant in which perfluoropolyether is solubilized in a solution of surfactant to give a liquid and stable monophasic solution during the time without supplying dispersion energy; the preparation of the microemulsion takes place indeed by mere mixing of the components.

The temperature of the PVDF synthesis is comprised between 30°–130° C., preferably 60°–120° C., the pressure is comprised between 30 and 100 bar.

The initiators which are employed in polymerization are those well known in the PVDF polymerization, for instance the organic proxides, such as for instance diterbutylperoxide (DTBP) and isopropylperoxydicarbonate (IPP).

The chain transfer agents which are employed are those well known in the patent literature for the PVDF polymerization, for instance it can be mentioned: isopropanol, acetone, ethyl acetate, trichlorofluoromethane ($CFCl_3$, 1,1,1-trifluoro-2,2-dichloroethane (HCFC-123).

As well known, a mineral oil or a paraffin, liquid at the polymerization temperature, is usually added in the polymerization in emulsion of the PVDF, in order to inhibit the coagulation of the polymer and hinder the adhesion to the reactor walls. It has been unexpectedly found by the Applicant that the use of the microemulsion in the polymerization system according to the present invention is obtained with a superior stability of the latex, wherefore the use of said mineral oils or paraffins (waxes) is not required.

Tests carried out by the Applicant have shown, by extraction measurements, that the surfactants generally used in the PVDF synthesis and described in the patent literature, such as for instance ammonium perfluorooctanoate or Surflon S111S (produced by Asahi Glass) are not completely removed after the coagulum step, washings and drying and amounts comprised between 150–600 ppm are still present on the final powder.

With the utilization of the microemulsions of the present invention, besides notably increasing the synthesis productivity in terms of higher polymerization rate, it is possible to do without the classic surfactants known in the PVDF patent literature and of the paraffinic waxes mentioned in the art on the PVDF polymerization in emulsion, and the sheets obtained by the pellets of the invention show an unexpected acceptable and improved white index. The surfactant amount on the powders is determined by extraction with solvents from the powder and successive gaschromatography of the extracted product (see the examples).

The following examples are given for illustrative purposes and are not limitative of the present invention.

EXAMPLE 1

Preparation of the Microemulsion (Microemulsion A)

In a glass reactor equipped with stirrer, under mild stirring, 4.83 g of NaOH are dissolved in 32.83 g of demineralized water. The obtained solution is added with:

1°) 52.35 g of acid having number average molecular weight 434 and the formula:

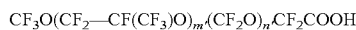

$CF_3O(CF_2—CF(CF_3)O)_m(CF_2O)_nCF_2COOH$ free from fractions having molecular weight higher than 700 and containing 9% by weight of fractions having molecular weight comprised between 600 and 700.

2°) 10 g of Galden$^{(R)}$ having the formula:

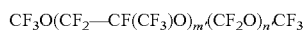

$CF_3O(CF_2—CF(CF_3)O)_{m'}(CF_2O)_{n'}CF_3$ wherein m'/n'=20, having number average molecular weight=760.

The obtained system results quite clear between 20° and 90° C.

VDF Polymerization

In a 21 l horizontal reactor, equipped with stirrer working at 50 rpm, 16 l of water and 50 ml of the microemulsion A containing 38.4 g of surfactant, are introduced.

The reactor is heated up to 125° C. and then brought to the pressure of 49 relative bar by feeding gaseous VDF.

Further to the feeding of 55 g of diterbutylperoxide the reaction is started and VDF is thus continuously fed so as to maintain the pressure constant of 49 relative bar. After 28 g of reacted monomer 62 g of HCFC-123 are fed as chain transfer agent.

After 56 g of reacted monomer the synthesis temperature is brought to 100° C. and the reaction continues at this temperature.

After a predetermined amount of monomer reacted corresponding to 4800 g the reaction is stopped. The total time of polymerization results equal to 486 minutes. The polymer concentration in the latex results equal to 250 g/l latex.

The number of particles of the latex of which the emulsion is formed, is measured by coulter nanosizer and results equal to $5.3 \times 10^{16}$ particles/liter of water (see Table (1).

The latex is then coagulated by mechanical stirring, the obtained slurry is then washed 10 times with demineralized $H_2O$ at room temperature with a ratio polymer/water 1/10 by weight and then dried at 80° C. for 24 hours.

By extraction with methanol and successive gaschromatography of the extracted product, a residual content of surfactant equal to 70 ppm (see Table 2) is determined on the powder.

Then the powder is pelletized by extrusion and on the final pellet the Melt Flow Index (MFI) and the second melting temperature ($T_{2f}$) are determined by DSC.

The thermal stability is then determined on 33×31×2 sheets molded by compression from pellets at 200° C. for 2 minutes, after 4 minutes of preheating. To better verify possible effects of discoloration the thermal stability is determined also on the post-treated sheets at 250° C.×2 hours in stove.

The thermal stability is quantitatively evaluated by measurements of white index on the sheets, according to ASTM E 313.

The MFI values, measured at 232° C. with 5 kg of load according to ASTM D-3222-88, the second melting temperature and the white indexes are reported in Table 3.

EXAMPLE 2 (Comparative)

One operates as in Example 1 except for the following variations:

instead of the microemulsion A are utilized as surfactant 17.6 g of Surflon S111 S (ammonium salt of mixtures of perfluorooctanoic, perfluoroonnonanoic and perfluorodecanoic acid) commercialized by Asahi Glass and 9 g of paraffinic wax (commercialized by AGIP® 122–126 having melting temperature 50–52° C.);

after 28 g of VDF consumed, 67 g of HCFC 123 are fed as chain transfer agent;

The reaction is stopped after 2800 g of monomer have been reacted in a polymerization time of 520 min. The results are reported in Tables 1–3.

From Table 1 it is noticed how the productivity is notably lower than that of Example 1.

From Table 2 it is noticed how the residual content of surfactant on the powder is higher than the values of Example 1. Besides, it is noticed that in this case wax residues are present.

In Table 3 it is shown as the polymer of Example 2, the MFI and $T_{2f}$ being equal, results to have a more marked discoloration from the point of view of the plates molded from pellets and post treated in temperature.

EXAMPLE 3 (Comparative)

Preparation of the Microemulsion (Microemulsion B)

In a glass reactor equipped with stirrer, under mild stirring, are added:

1°) 50 g of acid having number average molecular weight 570 and the formula:

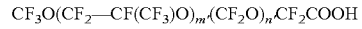

$CF_3O(CF_2—CF(CF_3)O)_m(CF_2O)_nCF_2COOH$ containing 28% by weight of fractions with molecular weight higher than 700 and 25% by weight of fractions having a molecular weight comprised between 600 and 700;

2°) 22.86 g of 10% by weight $NH_4OH$ solution;

3°) 60.47 g of demineralized water;

4°) 30 g of Galden$^{(R)}$ having the formula:

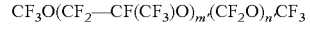

$CF_3O(CF_2—CF(CF_3)O)_{m'}(CF_2O)_{n'}CF_3$ wherein m'/n'=20, having number average molecular weight 760.

The obtained system results perfectly clear between 19 and 68° C.

VDF Polymerization

In a 21 l horizontal reactor, equipped with stirrer working at 50 rpm, 16 l of $H_2O$ and 90 ml of the microemulsion B containing 35.2 g of surfactant, are introduced. The example follows the scheme of Example 1 except that 89 g of HCFC-123 are fed.

After 4800 g of reacted monomer the reaction is stopped. The total time of polymerization results equal to 432 minutes.

The results are reported in Tables 1, 2, 3. From these tables it is stressed how the productivity is high but the quality of the polymer in terms of residual contamination by surfactant and colour of the molded sheets is poor.

TABLE 1

|  | Example 1 | Example 2 (comp) | Example 3 (comp) |
|---|---|---|---|
| number particles/l H$_2$O | $5.3 \times 10^{16}$ | $6.1 \times 10^{15}$ | $1.4 \times 10^{17}$ |
| latex concentration (g polymer/l latex) | 250 | 165 | 250 |
| polymerization time (minutes) | 486 | 520 | 432 |

TABLE 2

|  | Example 1 | Example 2 (comp) | Example 3 (comp) |
|---|---|---|---|
| residual surfactant powder (ppm) | 70 | 200 | 1200 |
| residual wax powder (ppm) | 0 | 1500 | 0 |

TABLE 3

|  | Example 1 | Example 2 (comp) | Example 3 (comp) |
|---|---|---|---|
| MFI at 5 kg (g/10 min) | 2 | 2 | 3 |
| T$_{2f}$ (° C.) | 166 | 167 | 166 |
| sheet molded from pellet 200° C. × 2 min WHITE INDEX | 75 | 65 | 36 |
| post-treated sheet 250° C. × 2 ore WHITE INDEX | 45 | 38 | 28 |

The invention claimed is:

1. VDF polymerization process, optionally modified with small amounts, generally comprised between 0.1 and 10% by moles, of one or more fluorocontaining comonomers, for preparing VDF polymers showing improved levels of white index, carried out in the presence of a microemulsion comprising a (per)fluoropolyether having neutral end groups, or microemulsions of fluoropolyoxyalkylenes having hydrogen containing end groups and/or hydrogen-containing repeating units, or microemulsions of fluoropolyoxyalkylenes having hydrogen-containing end groups and/or hydrogen-containing repeating units and hydrocarbons C$_1$–C$_{20}$, of aliphatic, aromatic or mixed type, optionally containing halogens, said fluoropolyethers having number average molecular weight from 400 to 3000, and a surfactant based on perfluoropolyethers with a sodium carboxylate end group, said surfactant having a number molecular weight Mn comprised between 400–600, and having a distribution of molecular weight such that fractions having a number average molecular weight greater than 700 are not present or are present in amount of less than 5% by weight.

2. VDF polymerization process according to claim 1, wherein a microemulsion comprising a perfluoropolyether with neutral end groups is utilized.

3. VDF polymerization process according to claim 1, wherein chlorotrifluoroethylene (CTFE), hexafluoropropene (HFP), tetrafluoroethylene (TFE) are utilized as comonomers.

4. VDF polymerization process according to claim 3, wherein the amount of modifying comonomer is comprised between 0.5–6% by moles.

5. VDF polymerization process according to claim 1, wherein the perfluoropolyethers with neutral end groups, optionally the end groups containing an hydrogen atom, utilized for preparing the microemulsions, comprise as repeating units sequences of one or more oxyfluoroalkylenic units such as —CF$_2$(CF$_2$)$_z$O—, wherein z is an integer equal to 1, 2 or 3, —CR$_4$R$_5$CF$_2$CF$_2$O— wherein R$_4$ and R$_5$ equal to or different from each other are chosen from H, Cl or perfluoroalkyl from 1 to 4 carbon atoms, —CF$_2$CF(CF$_3$)O—, —CFYO—, wherein Y is equal to F or CF$_3$.

6. VDF polymerization process according to claim 5, wherein the perfluoropolyethers have number average molecular weight comprised between 400 and 3000.

7. VDF polymerization process according to claims 5, wherein the perfluoropolyethers comprise as repeating units sequences of the classes:

a) (C$_3$F$_6$O)$_{m'}$(CFYO)$_{n'}$, wherein the unit (C$_3$F$_6$O) and (CFYO) are perfluorooxyalkylenic units statistically distributed along the chain; m' and n' are integers such as to give the molecular weight indicated above, and m'/n' is comprised between 5 and 40, when n' is different from 0; Y is equal to F or CF$_3$; n' can be also 0; said units inside the fluoropolyoxyalkylenic chain can optionally be bound among each other by a bond —O—R'$_f$—O—, wherein R'$_f$ has the meaning defined in c);

b) (C$_2$F$_4$O)$_{p'}$(CFYO)$_{q'}$—(C$_3$F$_6$O)$_{t'}$,
wherein p' and q' are integers such that p'/q' ranges between 5 and 0.3, preferably 2.7–0.5, and such that the molecular weight is the one indicated above; t' being an integer with the meaning of m', Y=F or CF$_3$; t' can be 0 and q'/q'+p'+t' lower than or equal to 1/10 and the t'/p' ratio is from 0.2 to 6;

c) CR$_4$R$_5$CF$_2$CF$_2$O wherein R$_4$ and R$_5$ are equal to or different from each other and chosen from H, Cl or perfluoroalkyl, for instance having 1–4 C atoms, the molecular weight being that indicated above, said units inside the fluoropolyoxyalkylenic chain being bound to each other as follows:
(OCR$_4$R$_5$CF$_2$CF$_2$)$_p$—O—R'$_f$—O—(CR$_4$R$_5$CF$_2$CF$_2$O)$_q$
wherein R'$_f$ is a fluoroalkylenic group, for instance from 1 to 4 C, p and q are integers from 0 to 200, and p+q is at least 1 and such that the molecular weight is that indicated above, d) CF(CF$_3$)CF$_2$O
said units being linked each other inside the fluoropolyoxyalkylenic chain as follows:
(OCF$_2$CF(CF$_3$))$_a$O—CF$_2$(R'$_f$)$_x$CF$_2$—O—(CF(CF$_3$)CF$_2$O)$_b$
wherein R'$_f$ has the meaning indicated above, x is 0 or 1, a and b are integers and a+b is at least 1 and such that the molecular weight is that indicated above, e) (C$_2$F$_4$O)$_{a'}$(CFYO)$_{b'}$,
wherein a' and b' are integers such that the molecular weight is inside the indicated range, a'/b' ranges between 5 and 0.3, preferably between 2.7–0.5, Y has the meaning indicated above.

8. VDF polymerization process according to claim 1, wherein the neutral end groups of the perfluoropolyethers are perfluoroalkyls from 1 to 3 carbon atoms, ClCF$_2$CF(CF$_3$)—, CF$_3$CFClCF$_2$—, ClCF$_2$CF$_2$—, ClCF$_2$—, in the case of microemulsions of fluoropolyoxyalkylenes having hydrogen-containing end groups, these are of the —CF$_2$H, —CF$_2$CF$_2$H, —CFH—CF$_3$ type.

9. VDF polymerization process according to claim 1, wherein the perfluoropolyethere surfactants have the same repeating units indicated for perfluoropolyethers.

10. VDF polymerization process according to claim 1, wherein the perfluoropolyethers have the following general formula:

$$R_f O(CF_2-CF(CF_3)O)_{m'}(CFYO)_{n'} R''_f$$

having a random distribution of the perfluorooxyalkylenic units, wherein $R_f$ and $R''_f$ equal to or different from each other are neutral end groups as defined above, M' and n' are integers such as to meet the above requirements of molecular weight, Y has the meaning indicated above; the surfactant based on perfluoropolyether has the following formula:

$$R_f-O-(CF_2CF(CF_3)-O)_{m'}-(CFY-0)_{n'}-CF_2COONa$$

wherein $R_f$, m' n' and Y have the above meaning indicated.

11. VDF homopolymers or VDF copolymers modified with amounts comprised between 0.1–10% by moles of one or more fluoro-containing comonomers according to claim 1.

12. VDF polymerization process according to claim 1, wherein the surfactant based on perfluoropolyethers has the following formula $$R_f-O(CF_2CF(CF_3)-O)_{m'}-(CFY-O)_{n'}-CF_2COONa$$

wherein $R_f$ is a C1 to C3 perfluoroalkyl group, $ClCF_2CF(CF_3)-$, $CF_3CFClCF_2-$, $ClCF_2CF_2$, $ClCF_2-$; Y=—F, $CF_3$; m' and n' are integers meeting the requirements of the number average molecular weight recited in claim 1.

13. The VDF polymerization process according to claim 1 wherein said surfactant has a number average molecular weight Mn comprised between 400–550.

* * * * *